(12) United States Patent
Kitamura

(10) Patent No.: US 9,090,123 B2
(45) Date of Patent: Jul. 28, 2015

(54) BICYCLE REAR HUB

(75) Inventor: Satoshi Kitamura, Osaka (JP)

(73) Assignee: Shimano Inc., Osaka (JP)

( * ) Notice: Subject to any disclaimer, the term of this patent is extended or adjusted under 35 U.S.C. 154(b) by 413 days.

(21) Appl. No.: 13/587,884

(22) Filed: Aug. 16, 2012

(65) Prior Publication Data

US 2013/0049446 A1 Feb. 28, 2013

(30) Foreign Application Priority Data

Aug. 29, 2011 (JP) ................................. 2011-186591

(51) Int. Cl.
*B60B 27/02* (2006.01)
*B60B 27/04* (2006.01)

(52) U.S. Cl.
CPC ............... *B60B 27/023* (2013.01); *B60B 27/04* (2013.01); *B60B 2900/325* (2013.01)

(58) Field of Classification Search
CPC .. B60B 27/04; B60B 27/073; B60B 27/0068; B60B 27/02; B60B 27/023
USPC ........................ 301/110.5; 73/514, 39, 862.29
See application file for complete search history.

(56) References Cited

U.S. PATENT DOCUMENTS

| | | | |
|---|---|---|---|
| 496,638 A | 5/1893 | Clark | |
| 3,599,482 A * | 8/1971 | Rundell | 73/862.326 |
| 4,966,380 A * | 10/1990 | Mercat | 280/259 |
| 5,031,455 A | 7/1991 | Cline | |
| 5,065,633 A * | 11/1991 | Mercat | 73/862.326 |
| 5,312,166 A * | 5/1994 | Nagano | 301/110.5 |
| 6,418,797 B1 | 7/2002 | Ambrosina et al. | |
| 6,924,569 B2 | 8/2005 | Endo et al. | |
| 7,042,123 B2 | 5/2006 | Kitamura et al. | |
| 7,199,500 B2 * | 4/2007 | Yoshida | 310/257 |
| 8,091,674 B1 * | 1/2012 | Zhang et al. | 180/220 |
| 8,278,789 B2 * | 10/2012 | Nakano | 310/67 A |
| 8,336,400 B2 * | 12/2012 | Lassanske | 73/862.29 |
| 8,677,837 B2 * | 3/2014 | Mercat et al. | 73/862.338 |
| 2009/0125251 A1 * | 5/2009 | Caretta et al. | 702/42 |
| 2011/0174110 A1 * | 7/2011 | Benkert et al. | 74/594.2 |
| 2012/0261978 A1 * | 10/2012 | Lu et al. | 301/6.5 |

FOREIGN PATENT DOCUMENTS

| | | |
|---|---|---|
| AT | 002268 U1 | 7/1998 |
| DE | 4431029 A1 * | 3/1996 |
| EP | 1545076 A2 * | 6/2005 |
| WO | 2011/066075 A1 | 6/2011 |

* cited by examiner

*Primary Examiner* — S. Joseph Morano
*Assistant Examiner* — Jean Charleston
(74) *Attorney, Agent, or Firm* — Global IP Counselors

(57) ABSTRACT

A bicycle rear hub includes a hub spindle, a drive part, a hub shell, at least one first opposed part, at least one second opposed part and a driving force measuring part. The drive part is rotatably supported on the hub spindle, and configured to receive a driving-force-input member. The hub shell is rotatably supported on the hub spindle and operatively coupled to the drive part for rotation by the drive part on the hub spindle. The at least one first opposed part is coupled to the drive part. The at least one second opposed part is coupled to the hub shell and is disposed oppose to the first opposed part. The driving force measuring part includes a pressure sensor provided for contacting the first and second opposed parts.

14 Claims, 7 Drawing Sheets

BICYCLE REAR HUB

CROSS-REFERENCE TO RELATED APPLICATIONS

This application claims priority under 35 U.S.C. §119 to Japanese Patent Application No. 2011-186591, filed Aug. 29, 2011. The entire disclosure of Japanese Patent Application No. 2011-186591 is hereby incorporated herein by reference.

BACKGROUND

1. Field of the Invention

This invention generally relates to a bicycle hub. More specifically, the present invention relates to a rear bicycle hub constituting the hub for a rear wheel of a bicycle.

2. Background Information

A rear hub for a bicycle is provided with a hub spindle disposed at the center of rotation of the rear wheel; a hub shell installed rotatably about the hub spindle; and a freewheel disposed adjacently to the hub shell in the axial direction. Rotation of a sprocket, which is engaged with a chain, is delivered to the hub shell by the freewheel. There is known in the prior art a rear huh for a bicycle in which a driving force measuring part capable of measuring driving force of a rider is disposed between the freewheel and the hub shell (see U.S. Pat. No. 6,418,797, for example).

The prior art rear hub for a bicycle has a coupling member for coupling the freewheel and the hub shell. The coupling member is formed to a hollow cylindrical shape, and the sprocket is installed on one end part thereof, while the other end part is coupled to the hub shell. The coupling member is disposed with a strain gauge for detecting twisting of a coupling part thereof, and detects the amount of twist of the coupling part. Driving force of a rider is measured from the amount of twist measured thereby.

SUMMARY

In the rear hub of the prior art, the strain gauge is affixed directly to the coupling part, and because it is necessary, for example, for the adhesive used for adhesion purposes to be made uniform, accuracy of assembly is difficult.

It is an object of the present invention to make possible more accurate measurement of driving force, and to facilitate assembly of the driving force measuring part.

In accordance with a first aspect of the invention, a bicycle rear hub is provided that basically comprises a hub spindle, a drive part, a hub shell, at least one first opposed part, at least one second opposed part and a driving force measuring part. The drive part is rotatably supported on the hub spindle, and configured to receive a driving-force-input member. The hub shell is rotatably supported on the huh spindle and operatively coupled to the drive part for rotation by the drive part on the hub spindle. The at least one first opposed part is coupled to the drive part. The at least one second opposed part is coupled to the hub shell and is disposed oppose to the first opposed part. The driving force measuring part includes a pressure sensor provided for contacting the first and second opposed parts.

In this bicycle rear hub, when rotation of the drive part is conveyed to the hub shell, the pressure acting on the pressure sensor, which can make contact with the first opposed part and the second opposed part, varies depending on the driving force (torque). The driving force can be detected from a signal produced by this change in pressure. Herein, because the driving force can be measured from a change in pressure by the pressure sensor, assembly of the driving force measuring part can be facilitated.

The bicycle rear hub according to a second aspect of the invention is a bicycle rear hub as recited in the first aspect, wherein the hub shell has a first end and an opposite end in the axial direction; and the second opposed part is disposed to the first end, at the driving-force-input member side of the hub shell. In this case, because driving force is conveyed to the hub shell from the drive part at a position in proximity to the driving-force-input member, the configuration can be made more compact.

The bicycle rear hub according to a third aspect of the invention is a bicycle rear hub as recited in the first or second aspect, further provided with a position adjusting mechanism for adjusting the position of the first opposed part and the second opposed part about the hub spindle. In this case, because the relative positions of the first opposed part and the second opposed part contacting the pressure can be adjusted about the hub spindle, measurement accuracy is even higher.

The bicycle rear hub according to a fourth aspect of the invention is a bicycle rear hub as recited in any of the first to third aspects, wherein the second opposed part is disposed in proximity to a downstream side of the first opposed part, in the direction of rotational driving.

The bicycle rear hub according to a fifth aspect of the invention is a bicycle rear hub as recited in any of the first to fourth aspects, wherein the first opposed part has an arm that extends radially outward. In this case, the first opposed part and the second opposed part are easily placed in opposition.

The bicycle rear hub according to a sixth aspect of the invention is a bicycle rear hub as recited in any of the first to fifth aspects, wherein the second opposed part projects out from the inside peripheral part of the hub shell. In this case, the first opposed part and the second opposed part are easily placed in opposition.

The bicycle rear hub according to a seventh aspect of the invention is a bicycle rear hub as recited in any of the first to sixth aspects, wherein the first opposed part projects out from the outside peripheral face of the drive part; and the second opposed part projects out from the inside peripheral part of the hub shell. In this case, the first opposed part and the second opposed part are more easily placed in opposition.

The bicycle rear hub according to an eighth aspect of the invention is a bicycle rear hub as recited in any of the first to seventh aspects, further provided with a third opposed part disposed to the hub shell, in opposition to the first opposed part; wherein the first opposed part is disposed between the second opposed part and the third opposed part. In this case, the first opposed part is wedged between the second opposed part and the third opposed part, and therefore the initial positions of the first opposed part and the second opposed part can be stabilized.

The bicycle rear hub according to a ninth aspect of the invention is a bicycle rear hub as recited in any of the first to eighth aspects, wherein a plurality of the first opposed parts and the second opposed parts are disposed spaced apart at intervals in the circumferential direction of the hub spindle. In so doing, pressure can be detected at multiple locations, and therefore driving force measurement accuracy is improved.

The bicycle rear hub according to a tenth aspect of the invention is a bicycle rear hub as recited in any of the first to ninth aspects, further provided with a wireless transmitter for transmitting, to the outside, information based on an output of the pressure sensor is wirelessly. Even when the pressure sensor rotates about the hub spindle, the output thereof can readily be routed to the outside.

The bicycle rear hub according to an eleventh aspect of the invention is a bicycle rear hub as recited in any of the first to tenth aspects, further provided with a power supply for supplying power to the pressure sensor. In this case, because a power supply is disposed, there is no need to furnish a power supply separately from the rear hub.

The bicycle rear hub according to a twelfth aspect of the invention is a bicycle rear hub as recited in the eleventh aspect, wherein the power supply is a battery. In this case, the configuration of the power supply is simpler.

The bicycle rear hub according to a thirteenth aspect of the invention is the bicycle rear hub as recited in the eleventh aspect, wherein the power supply is a generator. In this case, power is generated during travel of the bicycle, and therefore the need for external charging, or to replace a battery, is obviated.

The bicycle rear hub according to a fourteenth aspect of the invention is a bicycle rear hub as recited in any of the first to thirteenth aspects, wherein the drive part has a first member rotatably supported by the hub spindle a second member enabling installation of a driving-force-input member, the second member being rotatably supported by the first member; and a one-way clutch whereby rotation of the second member in the direction of advance of the bicycle can be conveyed to the first member. In this case, only rotation in the direction of advance of the bicycle is conveyed to the hub shell.

With the bicycle rear hub of this present disclosure, driving force can be measured through changes in pressure by the pressure sensor, and therefore assembly of the driving force measuring part is facilitated.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
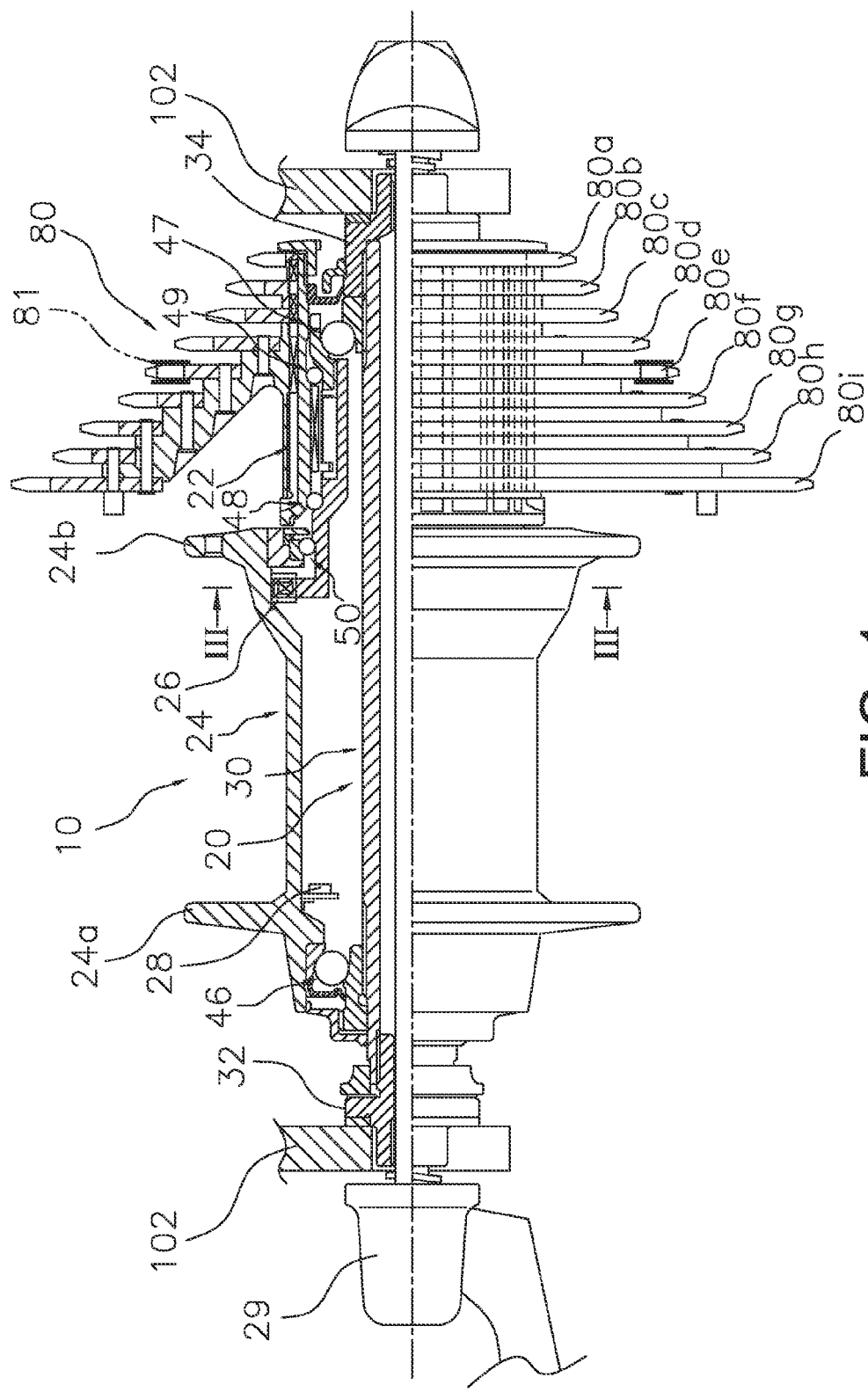
FIG. 1 is a half cross sectional view of a bicycle rear hub in accordance with a first embodiment.

Referring initially to FIG. 1, a bicycle rear hub 10 is illustrated in accordance with a first embodiment. The bicycle rear hub 10 is installable on a hub spindle mounting section 102 that is disposed to the rear part of the frame of a bicycle. The rear hub 10 is provided with a hub spindle 20; a drive part 22; a hub shell 24; first opposed parts 54; second opposed parts 56; third opposed parts 57; a position adjustment mechanism 59; a driving force measuring part 26; and a wireless transmitter 28. The hub shell 24 is rotatably supported on the hub spindle 20 by a first bearing 46. The drive part 22 is rotatably supported on the hub spindle 20 by a second bearing 47. The driving force measuring part 26 is capable of measuring the driving force of a rider. The wireless transmitter 28 wirelessly transmits information relating to measured driving force. The wirelessly transmitted information relating to driving force is displayed, for example, on a cycle computer, not shown, that is installable on the handlebar of the bicycle. Information such as speed of the bicycle, rotation speed of the crank (cadence), travel distance, and the like, is displayed on the cycle computer as well.

Figure 2:
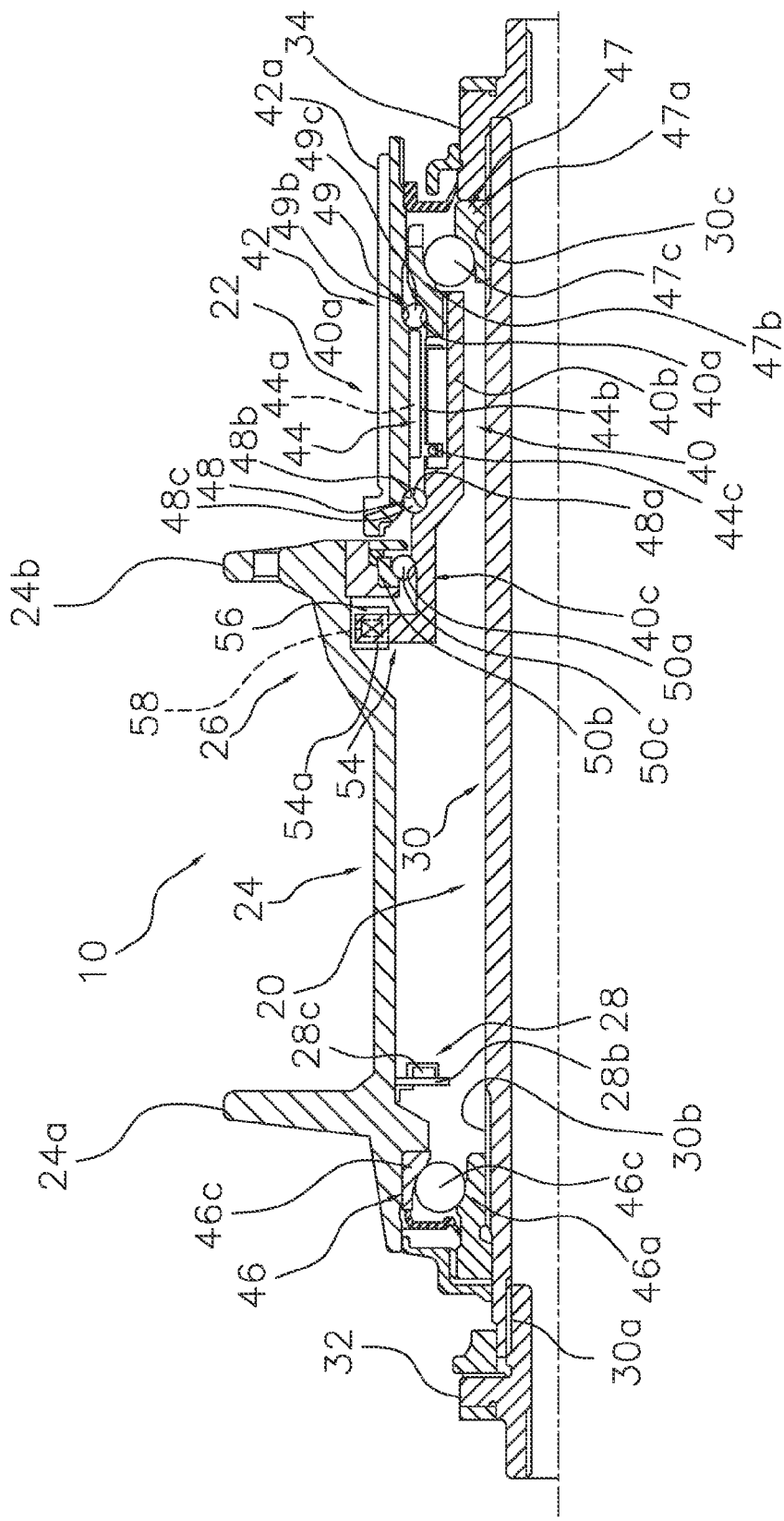
FIG. 2 is a fragmentary cross sectional of the bicycle rear hub in FIG. 1.

The hub spindle 20 has a hollow spindle body 30 with a quick release mechanism 29 installed thereon; a first lock nut 32 installed at a first end of the spindle body 30 (the end at the left side in FIG. 2); and a second lock nut 34 installed at a second end of the spindle body 30 (the end at the right side in FIG. 2). The hub spindle mounting section 102 is installable onto the first lock nut 32 and the second lock nut 34. Herein, a configuration whereby the first lock nut 32 and the second lock nut 34 install within the hub spindle mounting section 102 is disclosed, but a configuration whereby the spindle body 30 installs within the hub spindle mounting section 102 on the frame would be acceptable as well.

As shown in FIG. 2, a female thread part 30a is formed on the inner peripheral face of the first end of the spindle body 30. A first male thread part 30b and a second male thread part 30c are formed respectively on the outside peripheral faces of the first and second ends of the spindle body 30. The first lock nut 32 has a male thread part that threadably mates with the female thread part 30a, and is threadedly fastened onto the spindle body 30. The second lock nut 34 has a female thread part that threadably mates with the second male thread part 30c, and is threadedly fastened onto the spindle body 30.

The configuration of the drive part 22 includes a member called a freewheel. The drive part 22 has a first member 40 rotatably supported on the hub spindle 20; a second member 42 disposed to the outside peripheral side from the first member 40; and a one-way clutch 44 disposed between the first member 40 and the second member 42.

The first member 40 is a member of tubular shape rotatably supported on the hub spindle 20 by the second bearing 47. The second bearing 47 has a second inner race element 47a, a second outer race element 47b, and a plurality of second rolling elements 47c. The second inner race element 47a has a thread formed on the outside peripheral part thereof, and is threadedly fastened to the second male thread part 30c of the spindle body 30. The second outer race element 4M has a thread formed on the inside peripheral part thereof, and is threadedly fastened to a male thread part formed on the outside peripheral face of the first member 40. The second rolling elements 47c, spaced apart at intervals in the circumferential direction, are disposed between the second inner race element 47a and the second outer race element 47b. The second rolling elements 47c are rotatably retained by a retainer, not shown, and are disposed at predetermined intervals in the circumferential direction. The second rolling elements 47c may be spherical elements, or rollers.

The first member 40 has a first tubular part 40b provided in the outside peripheral part thereof with a recess 40a for housing a clutch pawl 44a of the one-way clutch 44. A first end of the first member 40 (the end on the left side in FIG. 2) extends as far as the inside peripheral side of the hub shell 24. The first member 40, at a first end side of the first tubular part 40b (the end on the left side in FIG. 2), has a second tubular part 40c larger in diameter than the first tubular part 40b. On the outside peripheral face of a boundary section of the first tubular part 40b and the second tubular part 40c, there is formed a third cone face 48a constituting a third bearing 48. On the outside face of the second tubular part 40c there is formed a fifth cone face 50a of a fifth bearing 50, for rotatably supporting the hub shell 24 on the drive part 22.

The second member 42 is a tubular member supported rotatably with respect to the first member 40, by the third bearing 48 and a fourth bearing 49. The third bearing 48 is formed by the third cone face 48a mentioned previously, a third cup face 48b, and a plurality of third rolling elements 48c. The third cup face 48b is formed on the inside peripheral face of a first end of the second member 42 (the end at the left side in FIG. 2). The third rolling elements 48c, spaced at intervals in the circumferential direction, are disposed between the third cone face 48a and the third cup face 48b. The third rolling elements 48c are rotatably retained by a retainer, not shown, and are disposed at predetermined intervals in the circumferential direction. The third rolling elements 48c may be spherical elements, or rollers.

The fourth bearing 49 is formed by a fourth cone face 49a formed on the outside peripheral face of the second outer race element 47b, a fourth cup face 49b, and a plurality of fourth rolling elements 49c. The fourth cup face 49b is formed on the inside peripheral face of the second member 42, in the medial part thereof in the direction of the hub spindle. The fourth rolling elements 49c, spaced apart at intervals in the circumferential direction, are disposed between the fourth cone face 49a and the fourth cup face 49b. The fourth rolling elements 49c are rotatably retained by a retainer, not shown, and are disposed at predetermined intervals in the circumferential direction. The fourth rolling elements 49c may be spherical elements, or rollers.

As shown in FIG. 1, the second member 42 has on the outside peripheral face thereof a sprocket installation part 42a for installation of a sprocket assembly 80. The sprocket assembly 80 rotates in unison with the second member 42. The sprocket assembly 80 is one example of the driving-force-input member. The sprocket installation part 42a has, for example, splines which are disposed on the outside peripheral face thereof, and which have projecting parts or recessed parts spaced apart at intervals in the circumferential direction. As shown in FIG. 1, the sprocket assembly 80 has several (e.g., nine) sprockets 80a to 80i with different numbers of teeth. Rotation of the crank, not shown, is conveyed to the drive part 22 by meshing of a chain 81 with any sprocket of the sprocket assembly 80. Herein, a plurality of sprockets are installed on the sprocket installation part 42a, but the number of sprockets installed on the sprocket installation part 42a may be singular.

As shown in FIG. 2, the one-way clutch 44 is disposed for the purpose of conveying to the first member 40 only rotation of the second member 42 in the direction of advance of the bicycle. In on doing, only rotation of the crank in the direction of advance is conveyed to the hub shell 24. Rotation of the hub shell 24 in the direction of advance is not conveyed to the second member 42. The one-way clutch 44 has a clutch pawl 44a disposed rockably between a first attitude and a second attitude in the recess 40a; ratchet teeth 44b formed on the inside peripheral face of the second member 42; and an urging member 44c for urging the clutch pawl 44a. The clutch pawl 44a contacts the ratchet teeth 44b when in the first attitude, and disengages from the ratchet teeth 44b when in the second attitude. The urging member 44c is installed in an annular groove formed in the first member 40. The urging member 44c is a spring member formed by bending a metal wire material to a "C" shape, and urges the clutch pawl 44a towards the first attitude.

The hub shell 24 has a structure that is splittable in the direction of the hub spindle. As shown in FIG. 2, the hub shell 24 at a first end thereof (the end at the left side in FIG. 2) is rotatably supported about the spindle body 30 of the hub spindle 20, by the first bearing 46. As mentioned previously, the second end of the hub shell (the end at the right side in FIG. 2) is rotatably supported about the spindle body 30 of the hub spindle 20, via the drive part 22, by the fifth bearing 50. The first bearing 46 has a thread formed on its inside peripheral face, and has a first inner race element 46a threadedly fastened onto the first male thread part Mb of the spindle body 30; a first outer race element 46b; and a plurality of first rolling elements 46c. The first rolling elements 46c are rotatably retained by a retainer, not shown, and are disposed at predetermined intervals in the circumferential direction. The first rolling elements 46c may be spherical elements, or rollers.

The fifth bearing 50 has the fifth cone face 50a mentioned previously; a fifth outer race element 50b that is, for example, fastened by being press-fit within the inside peripheral part of the second end of the hub shell 24; and a plurality of fifth rolling elements 50c. The fifth rolling elements 50c, spaced apart at intervals in the circumferential direction, are disposed between the fifth cone face 50a and the fifth outer race element 50b. The fifth rolling elements 50c are rotatably retained by a retainer, not shown, and are disposed at predetermined intervals in the circumferential direction. The fifth rolling elements 50c may be spherical elements, or rollers.

In the outside peripheral part of the hub shell 24, a first hub flange 24a and a second hub flange 24b adapted to couple with the spokes of the rear wheel of the bicycle are formed spaced apart at intervals in the axial direction of the hub spindle 20.

Figure 3:
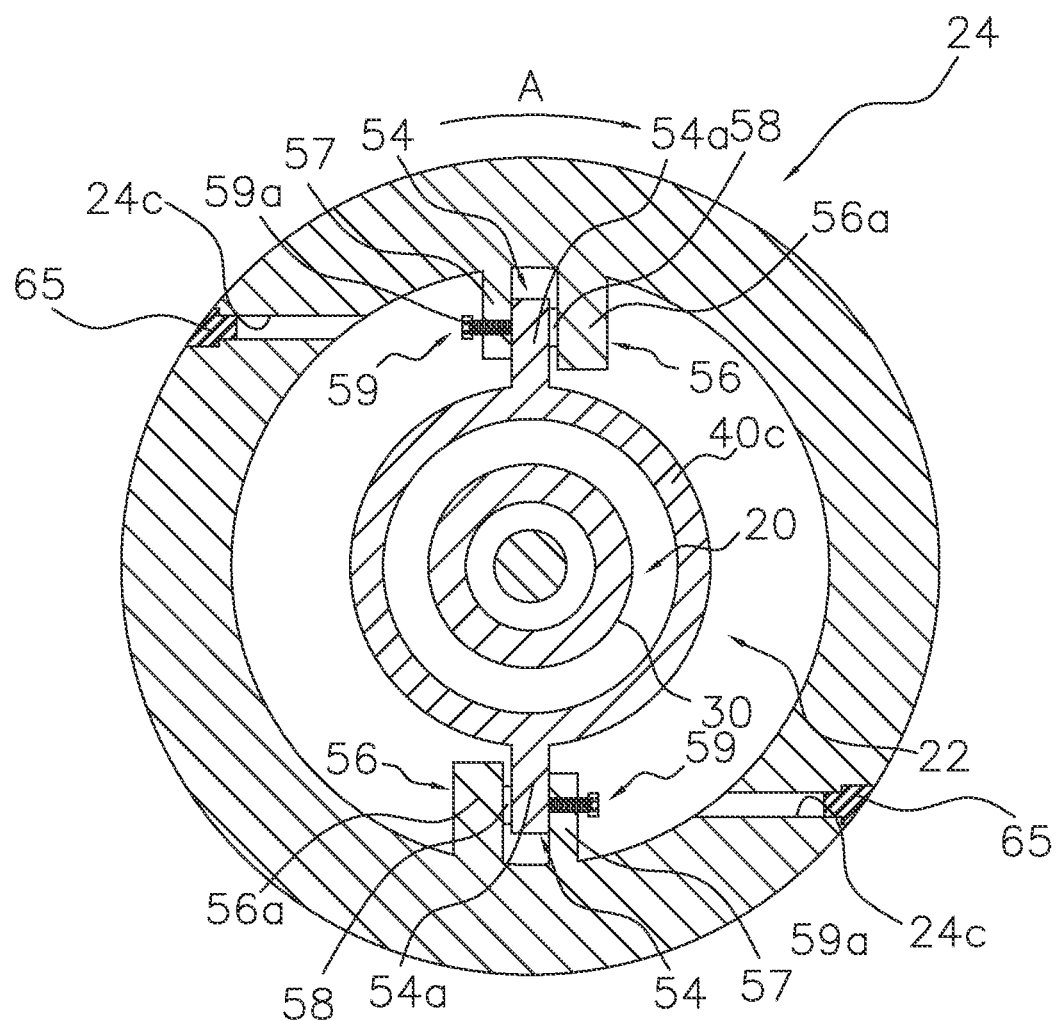
FIG. 3 is a cross sectional view of the bicycle rear hub taken along section line III-III in FIG. 1.

As shown in FIGS. 2 and 3, the first opposed parts 54 are disposed to a first end of the first member 40 of the drive part 22. The first opposed parts 54 are disposed to the first member 40, and extend outward from the outside peripheral part thereof; here, they project radially outward from the second tubular part 40c. The first opposed parts 54 have arms 54a that extend towards the inside peripheral face of the hub shell 24, from the outside peripheral part of the second tubular part 40c. At least one first opposed part 54 is provided. The first opposed parts 54 extend outward in a radial direction, beyond the outer race element 50 of the fifth bearing 50. The first opposed parts 54 are integrally formed with the drive part 22. In the first embodiment, there are disposed two first opposed parts 54, spaced apart at 180 degree intervals.

The second opposed parts 56 are disposed in proximity to the downstream side of the first opposed parts 54, in a direction of rotation shown by an arrow A, and in opposition to the first opposed parts 54. The direction of rotation shown by the arrow A is the direction of rotation when the bicycle is advancing. The second opposed parts 56 are disposed at a second end of the hub shell 24 (the end at the right side in FIG. 2). The second opposed parts 56 are disposed in proximity to the fifth bearing 50. The second opposed parts 56 have projecting portions 56a that project towards the drive part 22 from the inside peripheral part of the hub shell 24. The opposed faces of the arms 54a of the first opposed part 54, and of the projecting portions 56a of the second opposed parts 56, which are mutually opposed in the direction of rotation, are preferably disposed in parallel. The second opposed parts 56 are disposed in equal number to the first opposed parts 54. The second opposed parts 56 are integrally formed with the hub shell 28.

The third opposed parts 57 are disposed to the hub shell 24, in opposition to the first opposed parts 54. The third opposed parts 57 project from the inside peripheral part of the hub shell 26. The third opposed parts 57 are disposed to the opposite side of the first opposed part 54 from the second opposed parts 56. Consequently, the first opposed parts 54 are disposed between the second opposed parts 56 and the third opposed parts 57. The third opposed parts 57 are disposed either contacting the surface at the upstream side of the first opposed parts 54 in the direction of rotation shown by the arrow A, or separated by a predetermined distance from this surface. The third opposed parts 57 are integrally formed with the hub shell 28.

The position adjustment mechanism 59 adjusts the relative positions of the first opposed parts 54 and the second opposed parts 56 about the axis of the hub spindle 20, and adjusts the initial pressure acting on the pressure sensor 58. The position adjustment mechanism 59 has an adjustment screw 59a that screws into a screw hole 57a formed in the third opposed part 57. The adjustment screw 59a is, for example, a hexagonal socket bolt adapted to contact at the distal end thereof the first opposed part 54. The adjustment screw 59a can be turned by inserting an Allen key through an adjustment hole 24c passing through the hub shell 24. The adjustment hole 24c is closed off by a cap 65.

The driving force measuring part 26 has at least one pressure sensor 58. The pressure sensors 58 are disposed in contact with the first opposed parts 54 and the second opposed parts 56. The pressure sensors 58 detect pressure imparted in response to driving force, on a driving force conveying path for conveying of driving force from the drive part 22 to the hub shell 24. The driving force includes torque. Rotation of the first opposed parts 54 is imparted to the second opposed parts 56 via the pressure sensors 58. When a predetermined or higher level of driving force is imparted, the first opposed parts 54 and the second opposed parts 56 may come into partial contact, and minimize instances of imparting excessive force to the pressure sensor.

The wireless transmitter 28 has a circuit board 28b fastened to the inside peripheral part of the hub shell 24. The pressure sensors 58 and the circuit board 28b are electrically connected by wiring, not shown. On the circuit board 28b are mounted electronic components such as a microcomputer, an amplifier for amplifying the output of the pressure sensors 58, an analog-digital (AD) conversion circuit for converting the signal amplified by the amplifier to a digital signal, a wireless transmitting circuit, and the like; as well as a rechargeable battery 28c as the power supply. In the present embodiment, the microcomputer, the amplifier, and the AD conversion circuit constitute part of the driving force measuring part 26.

The wireless transmitter 28 wirelessly transmits information based on the output of the pressure sensors 58. The information wirelessly transmitted from the wireless transmitter 28 is displayed by a cycle computer, not shown, as driving force, torque, and/or power. Based on the output of the pressure sensors 58, the driving force, torque, and/or power may be calculated in the microcomputer disposed to the circuit board 28b; or the driving force, torque, and/or power may be calculated in the cycle computer, based on the received information. A primary battery may be disposed in place of the rechargeable battery 28c. The rechargeable battery 28c or the primary battery is detachably disposed to the circuit board 28b.

In the rear hub 10 configured in this manner, when the rider pedals the pedals attached to the bicycle, the rider's tread force is conveyed as driving force from the drive part 22 to the hub shell 24. At this time, the pressure of the pressure sensors 58 disposed on the driving force conveying path changes. An electrical signal representing this change is processed by the circuit board 28b, and is wirelessly transmitted to the cycle computer by the wireless transmitter 28. In the cycle computer, the wirelessly transmitted information representing the driving force is received and displayed. The rider can thereby be apprised of the self-generated driving force, torque, power, and the like.

Herein, because the driving force can be measured from changes in pressure by the pressure sensors 58, assembly of the driving force measuring part 26 can be facilitated.

Figure 4:
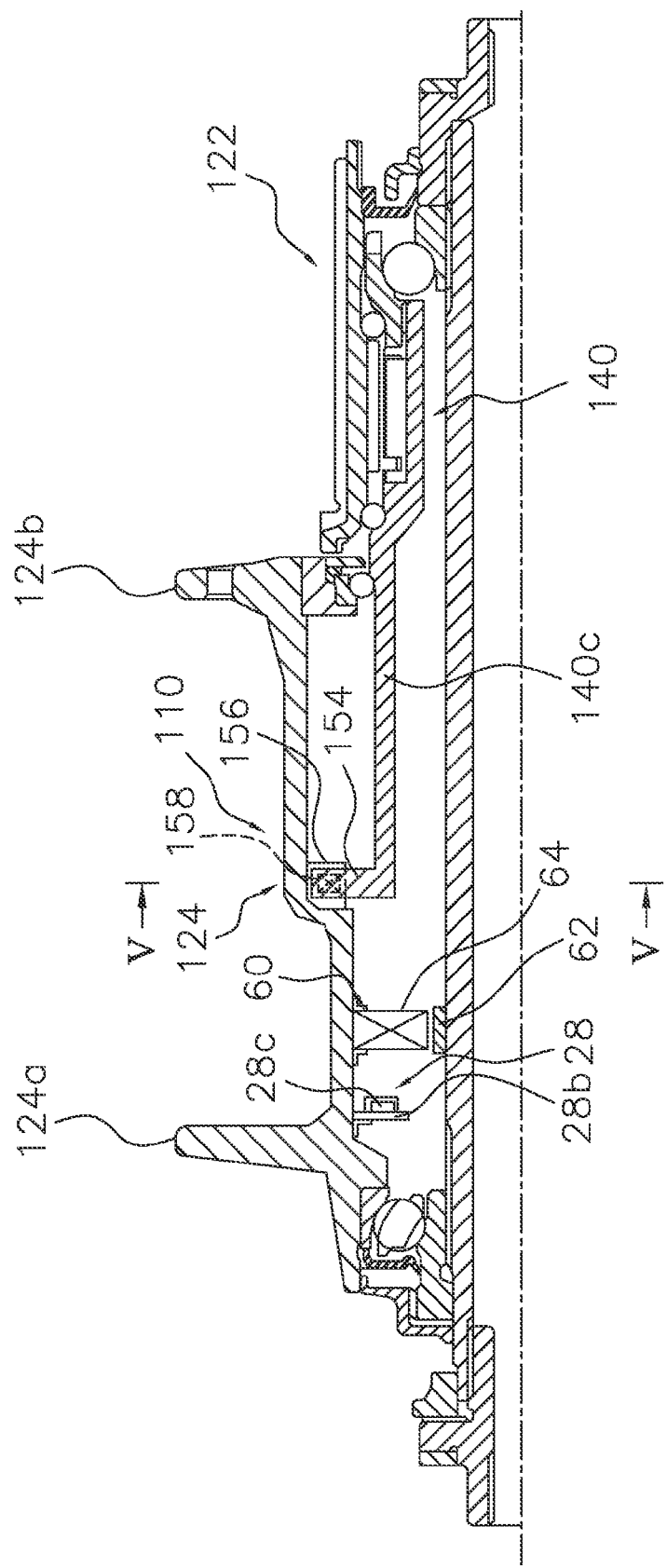
FIG. 4 is a fragmentary cross sectional view, corresponding to FIG. 2, of a bicycle rear hub in accordance with a second embodiment.
Figure 5:
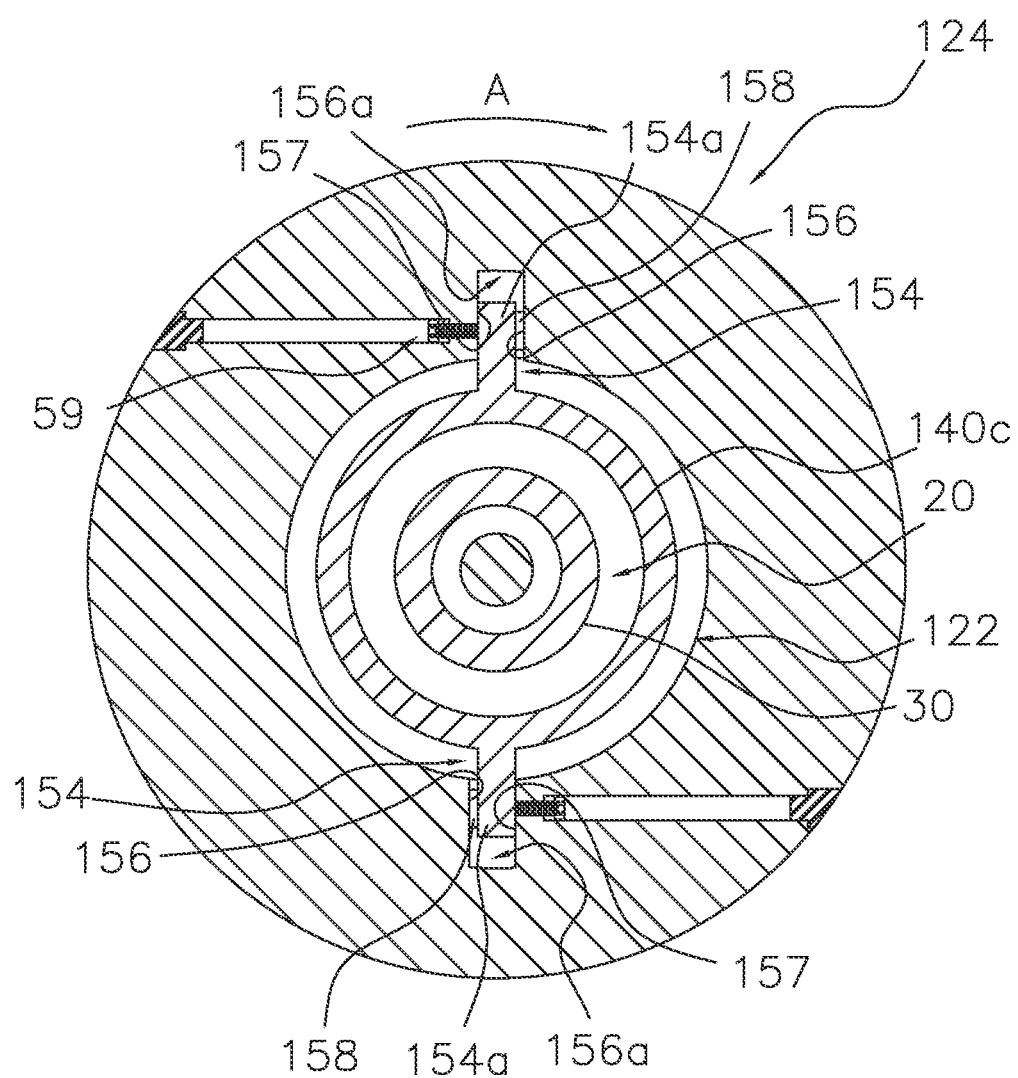
FIG. 5 is a sectional view of the bicycle rear hub taken along section line V-V in FIG. 4.

As shown in FIG. 4, a rear hub 110 is illustrated in accordance with a second embodiment. In the following description of the second embodiment, descriptions of members of configuration and shape of the second embodiment that are comparable to those of the first embodiment are omitted. As shown in FIG. 4, in the rear hub 110, a second tubular part 140c of a first member 140 of a drive part 122 extends up to a medial part of a hub shell 124 in the hub spindle direction. Consequently, first opposed parts 154 and second opposed parts 156 are disposed in the medial part of the hub shell 124. As shown in FIG. 5, the shape of the first opposed parts 154 is the same as those in the first embodiment having the arms 154a shown in FIG. 3. Pressure sensors 158 are disposed to the second opposed parts 156. In so doing, the length of the wiring for the pressure sensors 258 is shorter. The second opposed parts 156 and third opposed parts 157 are disposed to opposed recesses 156a formed by recession of the inside peripheral part of the hub shell 124. The opposed recesses 156a are formed by making recessions in such a way as to surround the distal end sections of the first opposed parts 154. The opposed faces at which the arms 154a of the first opposed parts 154 and the opposed recesses 156a oppose one another in the direction of rotation are preferably disposed in parallel.

A position adjustment mechanism 59 has the same configuration as that shown in FIG. 3 of the first embodiment. The pressure sensors 158 are disposed between the first opposed parts 15.4 and the second opposed parts 156, and contact both.

The rear hub 110 is disposed with a generator 60 as the power supply for the pressure sensors 158 and the wireless transmitter 28. The generator 60 has a magnet 62 fastened to the outside peripheral face of the spindle body 30 of the hub spindle 20; and a rotor 64 disposed in opposition to the magnet 62, to the outside peripheral side of the magnet 62. The rotor 64 has a coil bobbin fastened to the inside peripheral face of the hub shell 224; a magneto coil wound onto the coil bobbin; and a yoke disposed about the perimeter of the magneto coil. The output of the magneto coil is rectified to direct current by a rectifier disposed to the wireless transmitter 28. The rectified power is stored by the rechargeable battery 28c installed on the circuit board 28b, and used as a power supply.

According to the second embodiment configured as above, because the first opposed parts 154 and the second opposed parts 156 constituting the driving force conveying path are disposed in the medial part of the hub shell 124, torsion of the hub shell 124 is minimal, and the driving force is easily conveyed uniformly to the first hub flange 124a and the second hub flange 124b at the left and right sides.

Figure 6:
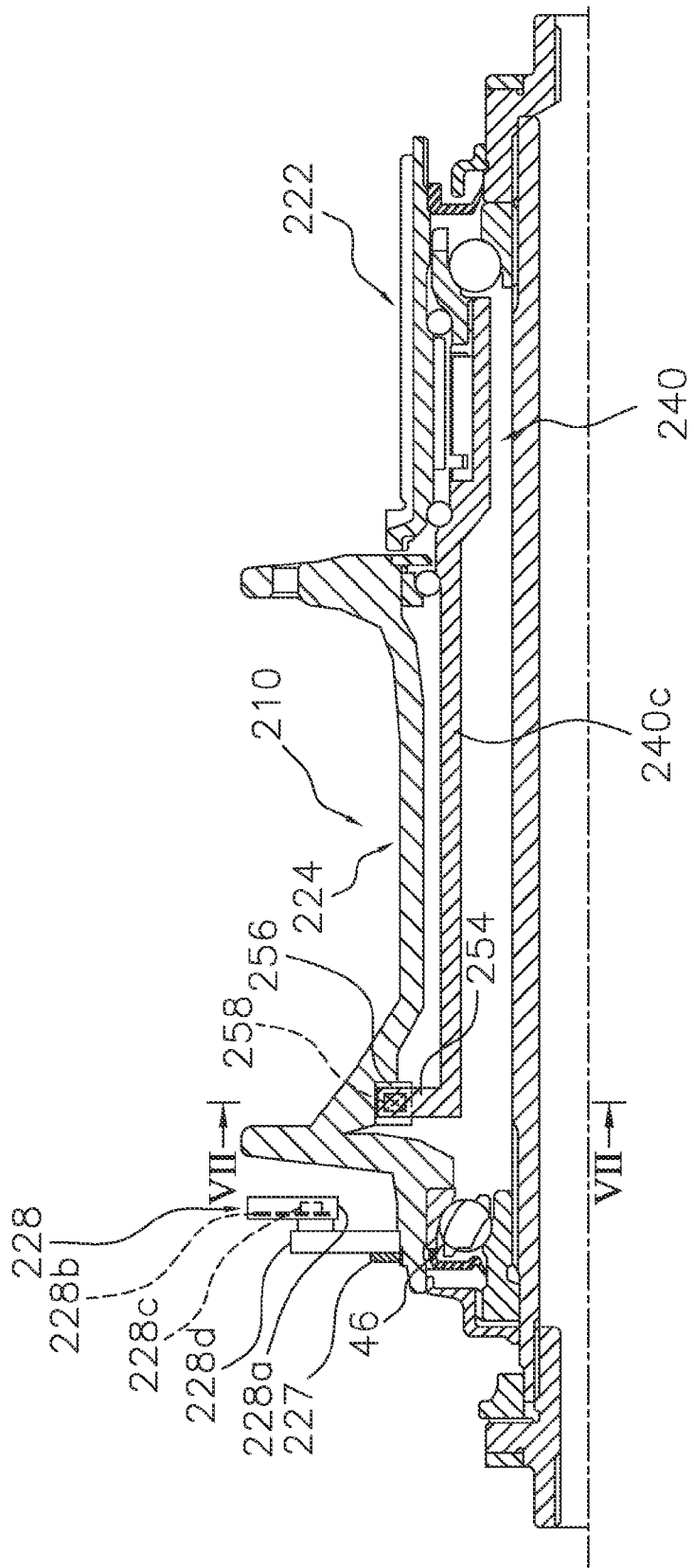
FIG. 6 is a fragmentary cross sectional view, corresponding to FIG. 2, of a bicycle rear hub in accordance with a third embodiment.
Figure 7:
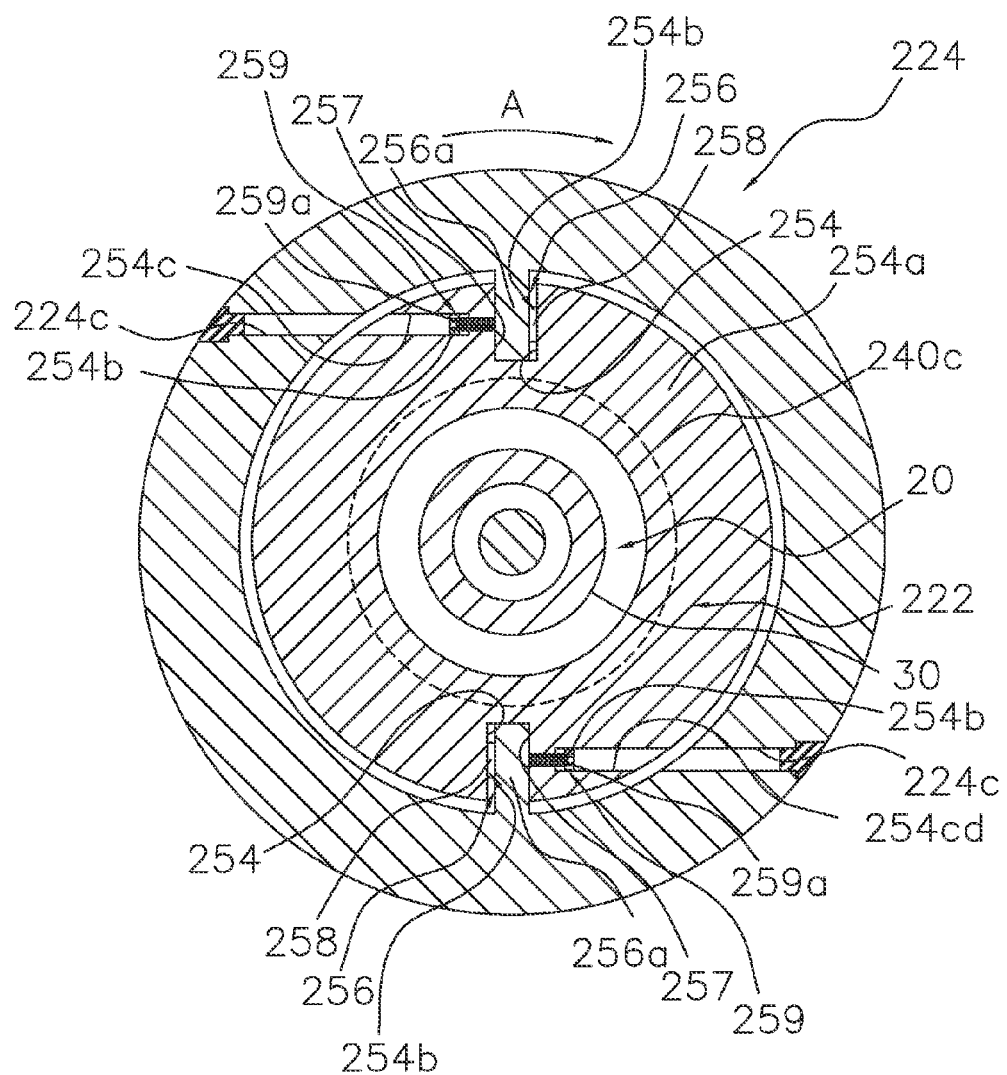
FIG. 7 is a cross sectional view of the bicycle rear hub taken along section line VII-VII in FIG. 5.

As shown in FIG. 6, a rear hub 210 is illustrated in accordance with a third embodiment. In the following description of the third embodiment, descriptions of members of configuration and shape of the third embodiment that are comparable to those of the first and/or second embodiment are omitted. As shown in FIG. 6, in the rear hub 210, a second tubular part 240c of a first member 240 of a drive part 222 extends to a position in proximity to a first end of the hub shell 124 (the end at the left side in FIG. 5). Consequently, first opposed parts 254 and second opposed parts 256 are disposed in proximity to the first bearing 46 of the hub shell 224. As shown in FIG. 7, the second opposed parts 256 disposed to the hub shell 224 have projecting portions 256a, and are similar in shape to those of the first embodiment. Pressure sensors 258 are disposed to the second opposed parts 156. In the third embodiment, the first opposed parts 254 are disposed on the outside peripheral part of an annular member 254a disposed to the drive part 222. The annular member 254a is disposed to the second tubular part 240c, and is integrally formed with the first member 240. The first opposed parts 254 have opposed recesses 254b formed by recession of the annular member 254a. The opposed recesses 254b are formed by recession so as to surround the distal end sections of the second opposed parts 256. Third opposed parts 257 are disposed not to the hub shell 224, but rather to the opposed recesses 254b, on the walls thereof that oppose the first opposed parts 256. The opposed faces at which the opposed recesses 254b of the first opposed parts 254 and the second opposed parts 256 oppose one another in the direction of rotation are preferably disposed in parallel.

A position adjustment mechanism 259 is disposed not to the hub shell 224, but rather to the second tubular part 204c. The position adjustment mechanism 259 has an adjustment screw 259a that screws into a screw hole 254b formed in the annular member 254a of the second tubular part 204c. An adjustment hole 254c that communicates with an adjustment hole 224c formed passing through the hub shell 224 is formed in the annular member 254a.

A wireless transmitter 228 is disposed, for example, in the outside peripheral part of the first end of the hub shell 224. The wireless transmitter 228 has a case 228a fastened to the outside peripheral face of the hub shell 224. The case 228a has a fastening part 228d for fastening to the hub shell 224. The hub shell 224 is passed through the fastening part 228d. By tightening a nut member 227, the fastening part 228d is fastened by being clamped directly or indirectly between the nut member 227 and the hub shell 224. A circuit board 228b is disposed within the case 228a. The pressure sensors 258 and the circuit board 28b are electrically connected by wiring, not shown. On the circuit board 228b are mounted electronic components such as a microcomputer, an amplifier for amplifying the output of the pressure sensors 258, an analog-digital (AD) conversion circuit for converting the signal amplified by the amplifier to a digital signal, a wireless transmitting circuit, and the like; as well as a rechargeable battery 228c as the power supply. The wireless transmitter 228 wirelessly transmits information based on the output of the pressure sensors 258. The information wirelessly transmitted from the wireless transmitter 228 is displayed by a cycle computer, not shown, as driving force, torque, and/or power. Based on the output of the pressure sensors 258, the driving force, torque, and/or power may be calculated in the microcomputer disposed to the circuit board 228b; or the driving force, torque, and/or power may be calculated in the cycle computer, based on the received information. A primary battery may be disposed in place of the rechargeable battery 228c. The rechargeable battery 228c or the primary battery is detachably disposed to the case 228a. The case 228a may be disposed, for example, with terminals employed when charging the rechargeable battery 228c.

By locating the wireless transmitter 22.8 on the outside of the hub shell 224 in this way, radio waves output from the wireless transmitter 228 are not easily blocked by the hub shell 224.

While the present invention has been described above in terms of certain preferred embodiments, the present invention is not limited to the previously described embodiments, and various modifications are possible within the scope and spirit of the invention.

In the previously described embodiments, the configuration of the drive part 22 includes a so-called free hub having a one-way clutch, but the present invention is not limited thereto. The present invention can be implemented, for example, in a rear hub lacking a free hub.

In the previously described embodiments, a rear hub having a quick release mechanism 29 is shown by way of example; however, the present invention can be implemented in a rear hub lacking a quick release mechanism.

In the previously described embodiments, a generator and a rechargeable battery are shown by way of examples of the power supply, but the present invention is not limited thereto. A rechargeable capacitor or other such storage element may be employed as well, for example. A non-rechargeable primary battery may be employed as the power supply as well.

In the previously described second embodiment, the generator 60 is employed to supply electrical power to the pressure sensors 158 and the wireless transmitter 28, but the present invention is not limited thereto. Instead, the wireless transmitter may detect the electrical power waveform of the alternating current output by the generator 60, and obtain a rotation speed signal for the rear hub. Information relating to the rotation speed signal obtained thereby, and torque representing the driving force measured by the driving force measuring part, may then be employed in the microcomputer to calculate the power. Additionally, by having the wireless transmitter transmit the information relating to the rotation speed signal to the cycle computer, which performs multiplication by the circumferential length of the rear wheel, the information can be employed for display of wheel speed by the cycle computer.

The configurations taught in each of the previously described embodiments can be combined with one another. For example, the first or second embodiment may be disposed with a generator inside the hub shell, as taught in the second embodiment. In this case, a configuration in which the hub spindle is disposed with a magneto coil, and the hub shell or the first member is disposed with a magnet, can be adopted for the generator. Moreover, in the second embodiment, a primary battery or a secondary battery may be disposed in place of the generator.

Whereas a position adjustment mechanism is provided in the previously described embodiments, it is not mandatory to furnish a position adjustment mechanism. The configuration can be simplified by doing so. Nor is the position adjustment mechanism limited to the configuration discussed previously. For example, a configuration whereby the second opposed parts are disposed moveably in the direction of rotation is acceptable; or, for example, sections opposing the first opposed parts and the third opposed parts may be disposed with grooves that extend in the hub spindle direction, into which grooves are inserted plate-shaped members, to thereby adjust the relative positions of the first and second opposed parts. By swapping of a plurality of plate-shaped members that differ in thickness, the relative positions of the first and second opposed parts can be readily adjusted.

Herein, two first opposed parts and two second opposed parts are disposed spaced apart at 180 degree intervals; however, the first opposed pads and second opposed parts may be one in number, or three or more in number. In preferred practice, the plurality of pairs of the first opposed parts 54 and the second opposed pads 56 are disposed at rotationally symmetrical positions about the center axis line of the hub spindle 20. Moreover, in preferred practice, the plurality of first opposed parts 54 are disposed such that the distances between neighboring first opposed parts 54 in the circumferential are equal, and the plurality of second opposed pads 56 are disposed such that distances between neighboring second opposed parts 56 in the circumferential direction are equal.

In the previously described embodiments, a configuration in which the third opposed parts and the position adjustment mechanism are not disposed is acceptable. For example, in a case in which the plurality of first opposed parts are disposed in proximity, a configuration in which the second opposed pads are wedged between the first opposed parts is acceptable.

In the previously described embodiments, any one or several of the first to fifth bearings may be modified to sliding bearings. Weight can be reduced in this case.

In the previously described embodiments, the section constituting the freewheel in the first member may be configured to be detachable from the other section. With this configuration, the freewheel can be replaced without constraint. The detachable section in the first member may be joined to the other section by a linking mechanism such as serrations.

Thus, the foregoing descriptions of the embodiments according to the present invention are provided for illustration only, and not for the purpose of limiting the invention as defined by the appended claims and their equivalents.

What is claimed is:

1. A bicycle rear hub comprising:
   a hub spindle;
   a drive part rotatably supported on the hub spindle, and configured to receive a driving-force-input member;
   a hub shell rotatably supported on the hub spindle and operatively coupled to the drive part for rotation by the drive part on the hub spindle;
   at least one first opposed part coupled to the drive part;
   at least one second opposed part coupled to the hub shell and being disposed oppose to the first opposed part; and
   a driving force measuring part including a pressure sensor provided for contacting the first and second opposed parts.

2. The bicycle rear hub according to claim 1, wherein
   the hub shell has a first end and an opposite end in the axial direction; and
   the second opposed part is disposed to the first end, at the driving-force-input member side of the hub shell.

3. The bicycle rear hub according to claim 1, further comprising
   a position adjusting mechanism for adjusting the relative positioning of the first opposed part and the second opposed part about the hub spindle.

4. The bicycle rear hub according to claim 1, wherein
   the second opposed part is disposed in proximity to a downstream side of the first opposed part, in the direction of rotational driving.

5. The bicycle rear hub according to claim 1, wherein
   the first opposed part has an arm that extends radially outward.

6. The bicycle rear hub according to claim 5, wherein
   the second opposed part projects out from the inside peripheral part of the hub shell.

7. The bicycle rear hub according to claim 1, wherein
   the first opposed part projects out from the outside peripheral face of the drive part; and the second opposed part projects out from the inside peripheral part of the hub shell.

8. The bicycle rear hub according to claim 1, wherein
   a third opposed part disposed to the hub shell, in opposition to the first opposed part;
   the first opposed part is disposed between the second opposed part and the third opposed part.

9. The bicycle rear hub according to claim 1, wherein
   a plurality of the first opposed parts and the second opposed parts are disposed spaced apart at intervals in the circumferential direction of the hub spindle.

10. The bicycle rear huh according to claim 1, wherein
    a wireless transmitter for transmitting, to the outside, information based on an output of the pressure sensor is wirelessly.

11. The bicycle rear hub according to claim 1, further comprising
    a power supply for supplying power to the pressure sensor.

12. The bicycle rear hub according to claim 11, wherein
    the power supply is a battery.

13. The bicycle rear hub according to claim 11, wherein
    the power supply is a generator.

14. The bicycle rear hub according to claim 1, wherein
    the drive part comprising
    a first member rotatably supported by the hub spindle;
    a second member enabling installation of a driving-force-input member, the second member being rotatably supported by the first member; and
    a one-way clutch whereby rotation of the second member in the direction of advance of the bicycle can be conveyed to the first member.

* * * * *